United States Patent [19]

Nordtvedt

[11] 4,274,184

[45] Jun. 23, 1981

[54] MESH DISTRIBUTION WHEELS

[76] Inventor: Svein Nordtvedt, Blomvikveien 27, Breivik, 5074 Godvik, Norway

[21] Appl. No.: 950,287

[22] Filed: Oct. 11, 1978

[30] Foreign Application Priority Data

Oct. 20, 1977 [NO] Norway ................................. 773596
Aug. 31, 1978 [NO] Norway ................................. 782965

[51] Int. Cl.³ ............................................. B65H 17/38
[52] U.S. Cl. ..................................... 29/121.1; 226/77; 226/87; 474/152; 474/162
[58] Field of Search ...................... 29/121.1; 74/243 R, 74/243 C, 216.5; 226/76, 77, 80, 81, 87; 264/DIG. 81; 474/162, 152

[56] References Cited

U.S. PATENT DOCUMENTS

| | | | |
|---|---|---|---|
| 548,001 | 10/1895 | Lloyd | 226/77 X |
| 605,443 | 6/1898 | Cooper | 74/243 R |
| 755,469 | 3/1904 | Eck | 29/121.1 X |
| 1,668,846 | 5/1928 | Harter | 74/243 C |
| 1,861,840 | 6/1932 | Claghorn | 74/243 C |
| 2,315,731 | 4/1943 | Paris | 226/87 X |
| 2,806,691 | 9/1957 | Kalin | 226/87 |
| 3,969,828 | 7/1976 | Roberts | 226/77 X |
| 4,013,752 | 3/1977 | Kalwaites et al. | 264/DIG. 81 |
| 4,162,032 | 7/1979 | Lockwood | 226/87 X |

FOREIGN PATENT DOCUMENTS 463095  11/1968  Switzerland ..................... 264/DIG. 81

Primary Examiner—James Kee Chi
Attorney, Agent, or Firm—Kenyon & Kenyon

[57] ABSTRACT

Mesh distribution wheel for handling seine lines or like net materials. The wheel is provided with a series of pins directed radially outwards which are adapted to engage respective meshes in a series of meshes in the seine line or like materials. The pins are arranged in series with a mutual pitch corresponding to the number of divisions of the series of meshes at a definite degree of mesh inlay. At any rate when regarded in the one lateral direction, the pins have a saw-toothed course from foot portion to outer portion. Adjacent their root portions, each pin has a definite cross-section or one defined together with a neighboring pin which corresponds to the area of a mesh opening in a mesh having a definite mesh size and definite mesh form.

20 Claims, 7 Drawing Figures

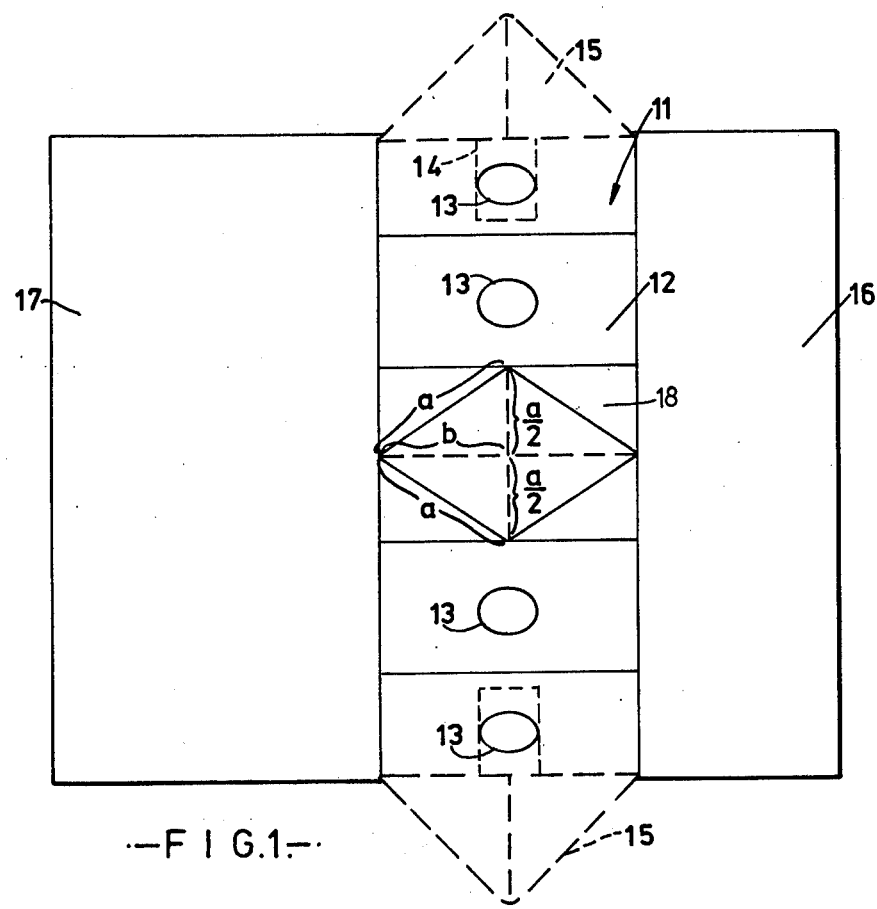
—FIG.1.—
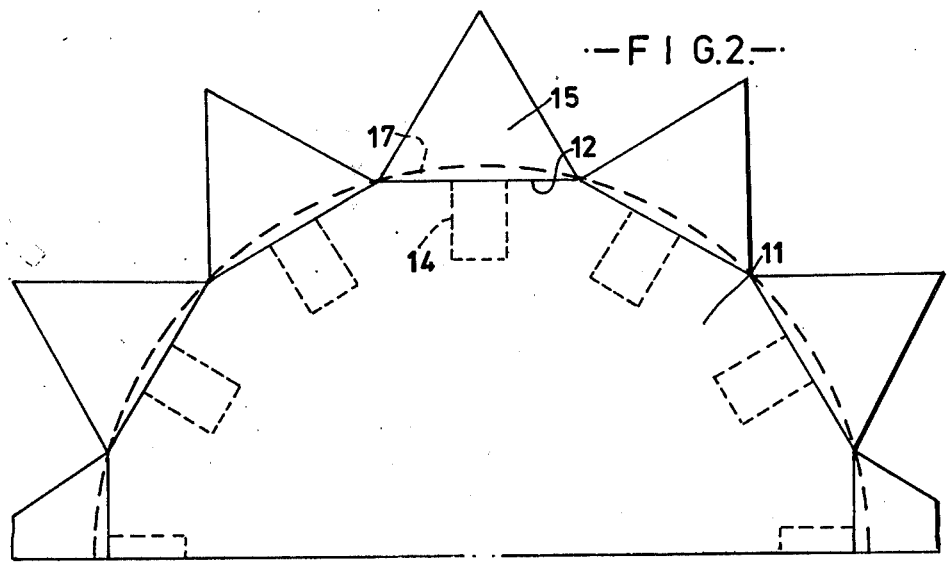
—FIG.2.—

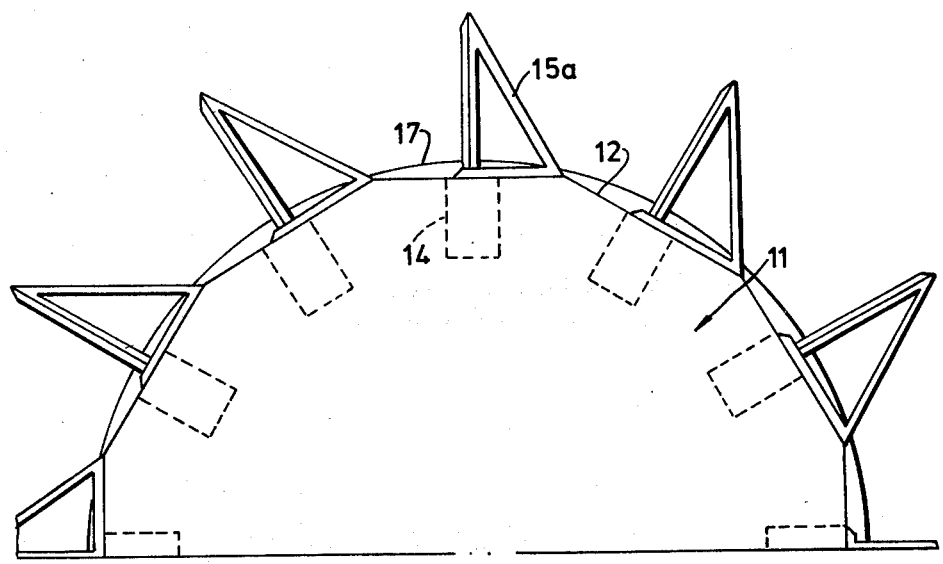
—FIG.3.—

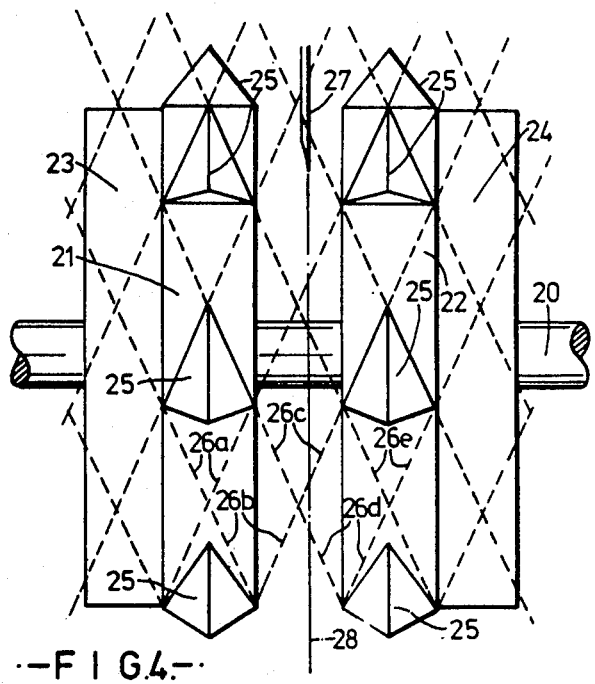
—FIG.4.—
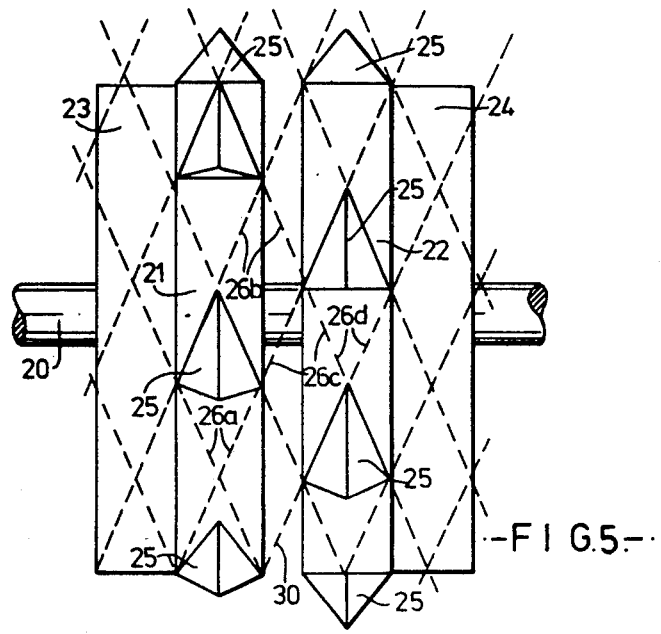
—FIG.5.—

MESH DISTRIBUTION WHEELS

This invention relates to mesh distribution wheels for handling seine lines, seines, nets, and the like made of seine lines, and is provided with a series of outwardly directed pins which are adapted to engage their respective meshes in a series of meshes in the seine line.

The mesh distribution wheel according to the invention is applicable for many different modes of use in connection with the handling of seine lines for manufacturing nets, seines, trawl equipment and the like. The mesh distribution wheel is, however, particularly considered for use in machines for joining together seine line units in to large nets, seines and trawl equipment and in machines for mounting bottom ropes (with weights and the like) and top ropes (with floats) into seines and nets and the like.

In handling smaller fishing equipment, such as relatively light fishing nets for fresh water use made of seine line of plastic filaments or the like, it is possible to handle the seine line in a relatively simple manner by allowing the seine line to be drawn together with guide lines in an oblique upwardly extending path—at the same time as the seine line is extended sideways—so that the seine line is spread out by the action of its own weight and distributes itself in a desired manner to a desired degree of insertion on the guide line so as to be mounted on top rope, bottom rope etc. in such an outstretched position by tying, sewing etc.

With larger fishing equipment which are to tolerate greater loads, larger quantities of seine line must be handled with greater dimensions of length and breadth and with corresponding greater weight. In such circumstances, the afore-mentioned mode of mounting is poorly suited, partly as a result of the large need for space which arises in order to be able to stretch out the seine line, but especially as a result of the large weight and relatively unwieldy handling which such large fishing equipment requires. Hitherto, it has been usual on handling seine lines for such large fishing equipment, to employ manual labour in order to obtain a uniform spreading out and a desired accurate distribution of the seine line, immediately in front of the mounting location.

With the present invention, the aim is to be able to effect the spreading out and distribution of the meshes in the seine line by machine with a definite, accurate degree of insertion, without the need for continuous manual labour.

Accordingly, the present invention resides in a mesh distribution wheel for handling seine lines or like net materials and provided with a series of pins directed radially outwards. The pins are adapted to engage their respective meshes in a series of meshes in the seine line or like net material and are arranged in series with a mutual pitch corresponding to the number of divisions of the series of meshes at a definite degree of mesh inlay. Also, the pins, at least when regarded in the one lateral direction, have a saw-toothed course from foot portion to outer portion. Further, each pin in a region adjacent its root portion has a definite cross-section selected from (a) one corresponding to the area of a mesh opening in a mesh having a definite mesh size and definite mesh form and (b) one which together with a neighbouring pin defines a cross-section corresponding to the area of a mesh opening in a mesh having a definite mesh size and definite mesh form.

With the solution according to the invention, there is the possibility independently of the action of the seine line in a lateral direction to be able to distribute the seine line along a series of meshes in an accurately determined manner, at a definite, accurate degree of insertion by allowing the seine line to move in a suitably curved motion or, if desired, in more or less a straight line movement over the top of the mesh distribution wheel.

It is preferred that each pin has a form selected from pyramidal, approximately conical and the like or portions of such a form and each pin has a square, triangular or other portion of square cross-section at its root portion.

By the term "degree of insertion" in the following description is to be understood the area a mesh has in a stretched condition. When a seine line is stretched 100% in the longitudinal direction (the mesh length equals double the length of the mesh member) the degree of inlay is 100% and correspondingly the degree of inlay is 75% for a seine line extended 75% and 50% for a seine line extended 50% (at 50% inlay the distance between two mesh corners, reckoned in the longitudinal direction of the mesh, is equal to the length of the mesh member). The degree of inlay thus gives clear expression to the form of the mesh relative to its longitudinal direction. In certain fishing equipment a definite degree of inlay is preferred, but this degree of inlay can vary in one and the same type of fishing equipment from producer to producer and the degree of inlay can obviously also vary to a significant degree in the different fishing equipment and even within one and the same fishing equipment (at the top and bottom of a fishing net). It is also usual that there be utilised seine line (or another net material) having different mesh sizes at different locations in one and the same fishing equipment (for example in a trawl) and different mesh sizes in different types of fishing equipment. There can consequently be a need to regulate the production equipment in a ready manner as required in the various fishing equipment which is to be manufactured. In production, where more or less wholly automatic manufacture or at least significantly mechanised operation is utilised, it is of the greatest importance that the operation be carried out in a precisely established manner. It is of particular importance that the seine line parts which are to be joined together or that a seine line part and a cordage which are to be mounted together, be advanced to the working location in a precisely established manner, that is to say at an accurately determined speed and with the intended shape of the meshes of the seine line. In this connection it is of the greatest importance that the seine line part be introduced into the working area with a precisely determined degree of inlay.

The mesh distribution wheel is applicable in a series of different work areas in connection with the production of fishing equipment, such as nets, trawls, and the like of seine line (and similar net material). In certain cases the mesh distribution wheel can be employed in its simple form. In other cases big advantages can be achieved with minor modifications.

In one embodiment of the invention, the mesh distribution wheel comprises two parallel wheel portions having respective pins or pin portions. Preferably, one wheel portion is axially displaceable relative to and is fixable in various desired positions separated axially from the remaining wheel portion.

While a simple mesh distribution wheel receives in an exact manner a series of meshes with the desired mesh shape which corresponds to a desired degree of inlay in a fishing equipment, the adjacent series of meshes will easily assume a fairly matching mesh form, so that the said adjacent series of meshes can be readily and relatively accurately machined in a sewing machine, mesh-splicing machine, mesh-splitting machine or the like. In accordance with the present invention, in addition to opening out such a series of meshes or several such series of meshes between two mutually separate wheel portions, there can be obtained a still greater exactness of the mesh form of the intermediate series of meshes, the intermediate series of meshes being stretched out sideways between the wheel portions at the same time as the adjacent series of meshes are stretched out in an accurate manner separately on the pins or the pin portions on a corresponding wheel portion. With such a solution with two parallel axially regulatable wheel portions one can achieve, for example, by dividing up the seine line, a particularly accurate division of the mechanised operation, each seine line part being able to be secured and conveyed further in a controlled manner separately on each wheel portion after the division. By allowing the seine line to pass over a substantial arc of the mesh distribution wheel this is especially easy.

By allowing the one wheel portion to be secureable in different peripheral angular positions relative to the other wheel portion, the mesh distribution wheel can be employed in an effective manner for joining together two parallel extending seine line portions with a zig-zag splicing thread by means of a mesh-splicing machine which functions in the region between the two series of meshes which are advanced in an accurate manner on their respective wheel portion.

In such a case the seine line can pass tangentially of or only via a minor proportion of the periphery of the mesh distribution wheel.

By utilising seine line with the same mesh size and the same degree of inlay for both the seine line parts which are to be sewed together, the wheel portions can be driven synchronously with a suitable angle displacement. In other cases, the wheel portions can advance the seine line parts with a somewhat different mesh size and with a somewhat different degree of inlay. Also in such instances, the wheel portions can be driven on one and the same shaft with the same speed of rotation, but with different diameters of the wheel portions and/or with different designs of the pins or of the pin portions of the wheel portions.

In connection with each wheel portion or in connection with the simple wheel it is, especially in connection with the mounting of cordage (float line, sink line, tension line, and the like) along the edge of a seine line, appropriate to advance the seine line and the cordage in an accurately adjusted relationship with respect to each other. The wheel portion or the wheel can be adapted to be used for a spectrum of different mesh sizes, the mesh in such cases lying at different radial distances from the root portion of the pin or the pin portion. In order to obtain correct advancement of the cordage relative to the advancement of the seine line, the cordage is allowed to pass over a support portion on the one side of the wheel portion or the wheel, just by the series of pins or pin portions. According to the invention it is preferred that the support portion is formed by a replaceable annular member, for regulating the axial and/or radial extension of the support portion. In this way the drawing of the cordage can be accurately adjusted according to the level of the seine line on the mesh distribution wheel, so that the cordage and seine line are brought into contact with each other at the desired equal speed.

In order to be able to use the wheel portion or the wheel for a still greater spectrum of different mesh sizes, it is preferred that the pins be secureable in radially regulatable positions in the mesh distribution wheel.

In order that the invention can be more clearly understood, convenient embodiments thereof will be described, by way of example, with reference to the accompanying drawings in which:

FIG. 1 is a representation of a mesh distribution wheel seen from above.

FIG. 2 is a cross-section of half the mesh distribution wheel.

FIG. 3 is a cross-section as in FIG. 2 and of an alternative construction of the mesh distribution wheel.

FIG. 4 is a representation of a mesh distribution wheel consisting of two parallel extending axially regulatable wheel portions having axially aligned pin portions.

FIG. 5 shows the same wheel portions as shown in FIG. 1 with the pin portion on the one wheel portion shown angularly displaced relative to the pin portion on the remaining wheel portion.

Figure 6:
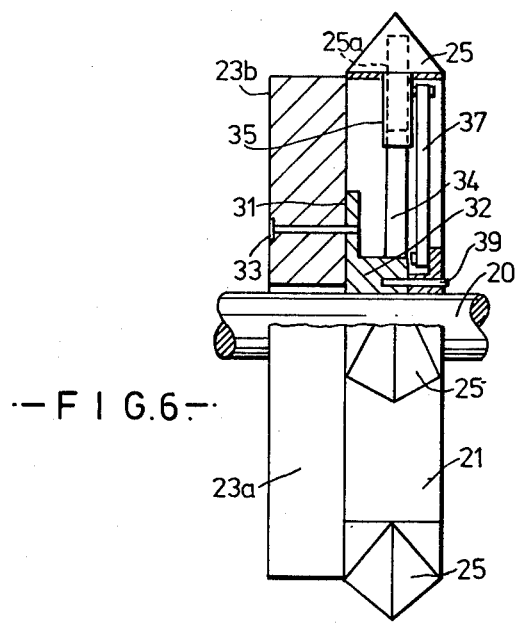
FIG. 6 is a view partly in section of a wheel portion and an associated support portion directed axially outwards.

Referring to FIGS. 1 and 2, a mesh distribution wheel is provided with a hub portion 11 having tangential surface portions 12 disposed in series one after the other peripherally of the hub portion 11. Centrally of each surface portion 12, there is cut out a bore 13 for the reception of a fastening stem 14 on a pin 15. Laterally outside the hub portion 11, there is arranged on one side of the wheel a relatively narrow, cylindrical edge guide portion 16 and on the opposite side of the wheel there is arranged a relatively broad, cylindrical edge guide portion 17. All according to the need for use, the breadth (and the diameter) of the adjacent edge guide portions can, however, be increased or reduced. If desired, the one (or both) of the edge guide portions can be omitted. For use in a machine for joining seine line units or for mounting top ropes, bottom ropes or other cordage to the seine line, it is, however, especially advantageous to be able to guide contiguous seine line meshes which run parallel to the seine line mesh which is to be handled by the mesh distribution wheel according to the invention, along their respective associated edge guide portion 16, 17.

In the preferred, illustrated embodiment, the pins 15 are made in pyramidal form and at the foot portion are adapted for the reception of a mesh of quadrilateral shape with a degree of insertion or inlay of 50%. In FIG. 1, there is shown schematically in full lines 18 a seine line mesh, while there is shown in dotted lines a pin 15 seen from above. It is evident that the bottom edges of the pin 15 coincide with members of the seine line mesh. With a 50% degree of insertion (degree of inlay) the length a of the mesh member corresponds to the diagonal length a of the mesh opening, reckoned in the longitudinal direction of the series of meshes, while the diagonal length of the mesh opening, reckoned in the transverse direction of the series of meshes, corresponds to a length $2b$. From the formula $(a^2/4)+b^2=a^2$ one finds the length $b=\sqrt{a^2-a^2/4}$ Furthermore, it is evident from the drawing that the peripheral length of the mesh corresponds to a length $4a$ and by employing a conical or another suitable pin shape with a tapered top, one can achieve a corresponding spread out of the mesh at 50% insertion by allowing the periphery of the pin at the foot portion to correspond to the length $4a$, at the same time as the number of divisions between the pins corresponds to the length $a$.

A degree of insertion of between 45 and 65 is the usual in various types of fishing equipment and in every single instance the division of the pins (i.e. center-line to center-line spacing can be adapted according to the degree of insertion. In the illustrated embodiment, there are employed compact pins, but it is also possible to utilise bow-shaped pins, for example with corresponding edge formations as in the illustrated pin. If desired, pins 15a can be employed with only half the cross-sectional area, as is shown in FIG. 3, neighbouring pins together providing for the desired mesh distribution with the desired degree of insertion.

In the embodiment illustrated in FIG. 3, the pins 15a are divided in an axial plane so as to be of pyramidal form with a triangular foot portion. Alternatively, the pins can be divided in a radial plane. In such an alternative case, the series of meshes can for example be laid against the pins at the one side of the wheel, while the series of meshes at the opposite side of the wheel are drawn laterally outwards by means of the seine line itself, for example in such a case where the seine line is drawn forwards by an edge line which is disposed at a distance of a pair of meshes sideways outside the series of meshes which are to be handled by the mesh distribution wheel. Also, in such an alternative case, there is obtained a desired uniform distribution of the meshes and a stretching of the meshes to the desired mesh shape.

It is apparent that the mesh distribution wheel can be designed with different diameters, with different pitch and with different shape of the pins, all according to the mode of use. Further it is apparent that the wheel can be free running, for example in such cases where the seine line is drawn forwards at a definite stroke or with a definite speed via a suitable drawing apparatus, for example, in connection with an apparatus for measuring the length of the seine line, that is to say an apparatus for continuously counting the rotations of the mesh distribution wheel gradually as a length of seine line is drawn over the wheel. It is also possible to allow the wheel to be separately driven with continuous or discontinuous or intermittent operation.

Referring to FIG. 4, there are secured on a drive shaft 20, two wheel portions 21, 22 with their respective support portions 23, 24 directed axially outwards and with their respective series of pin portions 25. The pin portions 25 are designed and arranged so that a series of meshes 26a on the wheel portion is received with a definite mesh form on the pin portions 25 on the wheel portion 21, while another series of meshes 26e is received with a corresponding mesh form on the pin portion 25 of the wheel portion 22. By fixing the wheel portions 21, 22 in a regulatable manner (not shown further) at a definite distance from each other, one ensures that a certain number of intermediate series of meshes 26b-26d are tightened and stretched into a matching mesh shape in the intermediate space between the wheel portions 22. In a corresponding manner to that described in the main patent, the pin portions 25 need not be designed with a cross-section which corresponds wholly to the shape of the mesh. In the illustrated embodiment pin portions 25 are shown with a cross-sectional area corresponding to half the cross-sectional area of the mesh and corresponding to half the shape of the mesh, the neighbouring pin portion on the same wheel portion by virtue of its corresponding shape and equivalent positioning in distance from the preceding pin portion provides for a corresponding extension of the remaining half of the cross-sectional area of the mesh and the remaining half of the mesh shape. If desired, two wheel portions can, in common, stretch out a common series of meshes. In the illustrated embodiment, three of the four corners of the mesh are held by the one pin portion, while the fourth corner of the mesh is held by the neighbouring pin portion as mentioned above. Alternatively, each pin portion (for example in the form of bow-shaped member) can hold only two of the four corners of a mesh, while the remaining two corners of the mesh are automatically localised to the intermediate space between the pin portion and a preceding pin portion and to the intermediate space between the pin portion and a subsequent pin portion respectively. By utilising two cooperating wheel portions, there is also obtained an automatic tightening of the intermediate series of meshes and an accurate retention of the remaining two mesh corners to the intermediate space between neighbouring pin portions on each wheel portion.

The support portions 23, 24 can support the seine line laterally outside their respective wheel portions, so that these parts of the seine line can also be spread out essentially with a mesh form corresponding to that in the region above and between the wheel portions. At 27, there is shown a knife for dividing the seine line along a line 28.

In FIG. 5, there are shown wheel portions 21, 22 somewhat angularly displaced with respect to each other, so that the pin portions 25 in the one wheel portion are angularly displaced relative to the pin portions in the other wheel portion. Between the two seine line parts which are advanced on their respective wheel portions, there is formed an intermediate space and in this intermediate space there is bound (with the aid of a splicing machine not shown further) a splicing thread 30 in a zig-zag path as indicated by dotted lines, to form two intermediate series of meshes 26b, 26c between the series of meshes 26a and 26d on the two wheel portions 21, 22. After the splicing together there is formed, as a consequence of an accurately regulated distance between the wheel portions, a coherent net with precisely fashioned mesh shapes in the said intermediate series of meshes 26b, 26c, equivalent to the mesh shapes in the series of meshes 26a and 26b.

In the embodiments of FIGS. 4 and 5, there are shown a net part and two net parts, respectively, with 50% insertion, that is to say the net part is shown with a mesh form which is elongated in the longitudinal direction of the net part. In other instances, the mesh shap can be elongated in the depth direction of the net part. In most instances, it is arbitrary how far the longitudinal axis of the mesh form extens in the longitudinal direction of the net part or in its depth direction. It is also immaterial which degree of insertion is to be utilised in that equipment or that net which is to be produced. Consequently, in such cases, one will just as well choose a pin shape of quadratic pyramidal form or having, for example, the half portion (triangular form) of such a quadratic pyramidal form. As a result, there can be effected with one and the same mesh distribution wheel based upon the same mesh size, division (splicing) of the net parts independently of whether it concerns division (or splicing) in the longitudinal direction or the depth direction and independently of the degree of insertion for that equipment or that net which is to be produced.

In the illustrated embodiments, regard has not been paid to all the special applications for the mesh distribution wheel. In an instance where two net parts are to be sewed together during application of pins as shown in FIG. 4, a pin with half the mesh cross-section can form a guide for the splicing means along the half annular surface of the pin, while in an instance where the cross-section of the pin is equivalent to the square mesh form, there can be effected a suitable opening at one corner of the pin, for example, in the form of a slot at one corner of the pin in alignment with a semi-annular plane between two opposite corners of the pin. In other instances, for example, in cases where the net is to be sewed securely to a cordage and where the cordage is to be laid tightly up to a series of meshes, the adjacent corner portion of the pin or portions of this corner portion can be cut away.

In FIG. 6, there is shown a wheel portion 21 (or a separate wheel) of which the upper portion is shown in section. There is employed a fastening flange 31 on a wheel hub 32 for securing a support portion 23 in the form of a replaceable ring. In the illustrated embodiment, the ring is indicated as being in the form of two annular members 23a, 23b which are fixed separately with fastening screws 33 to fastening flanges 31. It is apparent that support portions having different diameters and with different axial extensions can be readily mounted in place, as required.

Figure 7:
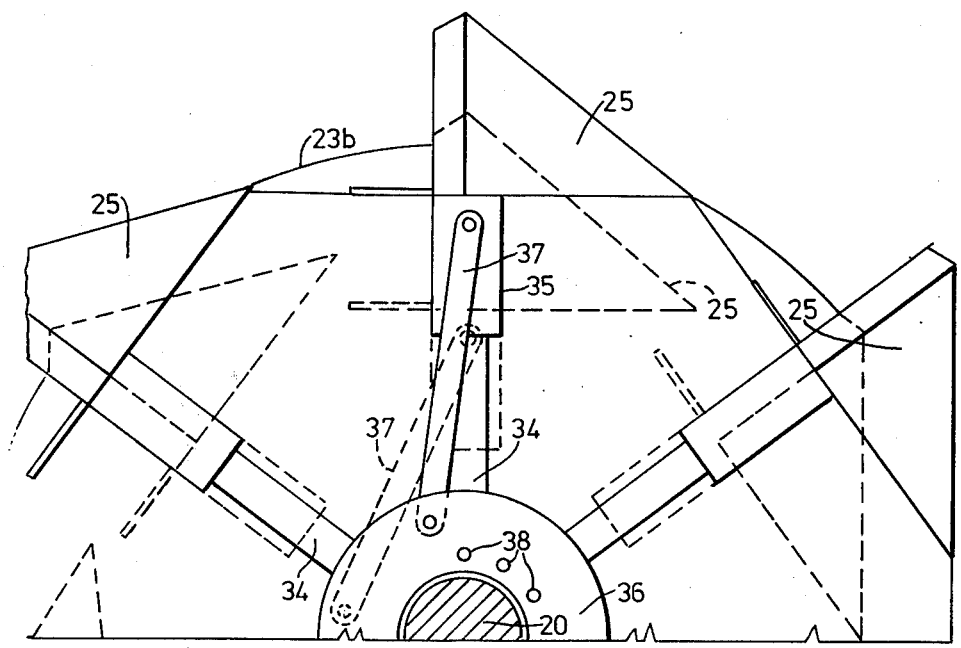
FIG. 7 is a radial section of a part of the wheel portion of FIG. 3.

As is evident from FIGS. 6 and 7, there is fastened to the wheel hub 32 a series of guide pegs 34 (only one is shown in the drawing) projecting radially outwards which support their respective pin portions 25 in an internal bore 25a in the pin part and in a connected socket member 35. The pin portion 25 can be secured at different radial distances from the wheel shaft, as is indicated in full and broken lines in FIG. 7. In the illustrated embodiment, there is shown a common annular adjusting means 36 with associated adjusting arms 37 for simultaneous adjustment of the pin portions 25 of the wheel portion. It is apparent that separate adjustment of the pin portions on their respective guide pegs will also be possible. The adjusting arms 37 in the illustrated embodiment are linkably connected to the socket member 35 of the pin part and the adjusting means 36 which extends annularly about the shaft 20. By means of predeterminedly arranged bores 38 in the wheel hub 32 and a corresponding bore in the adjusting means 36, the positioning of the adjusting means can be guaranteed with a locking pin 39 in precisely established positions with correspondingly precisely established radial positions for the pin portions. In this way, it is possible to achieve a regulation of the peripheral dimension of the wheel portion according to different mesh sizes, in an easily adjustable, accurate manner by radially regulating the distance of the pins from the rotary axis. In addition, on effecting replacement of a support portion with a diameter suited for that purpose, one can correspondingly adjust the advancement of the seine line and the advancement of the cordage in an accurately determined manner relative to each other at a mutually adjusted speed, so that the seine line can be secured to the cordage in an operatively reliable manner with an accurate degree of insertion.

With one and the same radially regulatable pin portion, the meshes in a seine line with different mesh sizes can thus be stretched with correspondingly large degrees of insertion, by altering the distance of the pin portion from the wheel shaft and at the same time altering the diameter of the support portion of the wheel portion in an equivalent manner. By replacing the pin portions with other pin portions the shape of the mesh can be correspondingly altered and by this a correspondingly different degree of insertion can be created during mounting of the cordage on the seine line.

What I claim:

1. Mesh distribution wheel for handling seine lines or like net materials and provided with a series of pins directed radially outwards, said pins being adapted to engage their respective meshes in a series of meshes in said seine line or like net material and being arranged in series with a mutual pitch corresponding to the number of divisions of the series of meshes at a definite degree of mesh inlay and wherein the pins, at least when regarded in the one lateral direction, have a saw-toothed course from foot portion to outer portion and each pin in a region adjacent its root portion has a definite cross-section selected from (a) one corresponding to the area of a mesh opening in a mesh having a definite mesh size and definite mesh form and (b) one which together with a neighbouring pin defines a cross-section corresponding to the area of a mesh opening in a mesh having a definite mesh size and definite mesh form.

2. The wheel of claim 1, wherein each pin has a form selected from pyramidal, approximately conical and the like portions of such a form and each pin has a square, triangular or other portion of square cross-section at its root portion.

3. The wheel of claim 1, which comprises two parallel wheel portions having their respective pins or pin portions.

4. The wheel of claim 3, wherein one wheel portion is axially displaceable relative to and is fixable in various desired positions separated axially from the remaining wheel portion.

5. The wheel of claim 4, wherein said one wheel portion is fixable in various peripheral angular positions relative to the remaining wheel portion.

6. The wheel of claim 1, wherein said wheel is laterally extended with a support portion on at least the one side of the series of pins, said support portion being formed by a replaceable annular member for regulating at least one of the axial and radial extensions of the support portion.

7. The wheel of claim 6, wherein the pin portions are fixable in radially regulatable positions.

8. The wheel of claim 7, wherein the pin portions are radially displaceable on their respective guide pegs.

9. The wheel of claim 8, wherein the pin portions are radially adjustable by means of a common adjusting means.

10. A mesh distribution wheel for a seine line having a plurality of meshes of quadrilateral shape comprising
a hub portion, and
a plurality of pins circumferentially spaced about said hub portion in a radiating saw-tooth manner at a center-line to center-line spacing corresponding to a predetermined degree of insertion of the meshes, each said pin having a foot portion for receiving a mesh of quadrilateral shape thereabout and for engaging at least two corners of the mesh.

11. A mesh distribution wheel as set forth in claim 10 wherein each pin is of pyramidal form with a rectangular foot portion.

12. A mesh distribution wheel as set forth in claim 10 wherein each pin is of pyramidal form with a triangular foot portion.

13. A mesh distribution wheel as set forth in claim 10 wherein said hub portion has a plurality of tangential surface portions disposed in series peripherially of said hub portions, and each said pin includes a stem slidably mounted in said hub portion to mount a respective pin on a respective tangential surface portion.

14. A mesh distribution wheel as set forth in claim 13 wherein each pin is of pyramidal form with a quadrilateral foot portion.

15. A mesh distribution wheel as set forth in claim 13 wherein each pin is of pyramidal form with a triangular foot portion.

16. A mesh distribution wheel as set forth in claim 13 which further comprises a cylindrical edge guide portion on at least one lateral side of said hub portion.

17. A mesh distribution wheel as set forth in claim 10 which further comprises a common adjusting means having adjusting arms connected to said respective pins for radially adjusting said pins relative to said hub portion.

18. A mesh distribution wheel for seine lines having a plurality of meshes of quadrilateral shape comprising
a drive shaft;
a pair of wheel portions mounted on said drive shaft at a definite distance from each other; and
a plurality of pins circumferentially spaced about each wheel portion in a radiating saw-tooth manner at a center-line to center-line spacing corresponding to a predetermined degree of insertion of the meshes, each said pin having a foot portion for receiving a quadrilaterally shaped mesh of a seine thereabout and for engaging at least two corners of the mesh.

19. A mesh distribution wheel as set forth in claim 18 wherein said pins on one of said wheel portions are angularly displaced with respect to said pins of the other of said wheel portions.

20. A mesh distribution wheel as set forth in claim 18 wherein each pin is of a cross-sectional shape at said foot portion corresponding to one-half the cross-sectional shape of a mesh of a seine.

* * * * *